United States Patent [19]

Blanz

[11] 4,290,494
[45] Sep. 22, 1981

[54] FLEXIBLE SHAFT AND ROOF DRILLING SYSTEM

[75] Inventor: John H. Blanz, Carlisle, Mass.

[73] Assignee: The United States of America as represented by the United States Department of Energy, Washington, D.C.

[21] Appl. No.: 946,401

[22] Filed: Oct. 2, 1978

[51] Int. Cl.³ .......................... B23Q 5/00; E21C 5/00
[52] U.S. Cl. ................................. 173/149; 64/2 R; 173/160
[58] Field of Search ................. 173/149, 147, 160; 64/2 R

[56] References Cited

U.S. PATENT DOCUMENTS

| | | | |
|---|---|---|---|
| Re. 25,543 | 3/1964 | Rugg et al. | 64/2 R X |
| 177,490 | 5/1870 | Baulieu | 64/2 R |
| 434,748 | 8/1890 | Almond | 64/2 |
| 1,952,301 | 3/1934 | Webb | 64/2 R |
| 2,917,909 | 12/1959 | Josutis | 64/2 |
| 3,000,197 | 9/1961 | Rugg et al. | 64/2 R |
| 3,146,576 | 9/1964 | Wezel | 64/2 R X |
| 3,388,505 | 6/1968 | Dreiling | 64/2 R |
| 4,057,115 | 11/1977 | Blanz | 64/2 R X |

FOREIGN PATENT DOCUMENTS 1079902  4/1960  Fed. Rep. of Germany ....... 64/2 R

*Primary Examiner*—Ronald Feldbaum
*Attorney, Agent, or Firm*—Herbert L. Bello

[57] ABSTRACT

A system for drilling holes in the roof of a mine has a flexible shaft with a pair of oppositely wound, coaxial flat bands. One of the flat bands defines an inner spring that is wound right handed into a helical configuration, adjacent convolutions being in nesting relationship to one another. The other flat band defines an outer spring that is wound left handed into a helical configuration about the inner band, adjacent convolutions being nesting relationship with one another. A transition member that is configured to hold a rock bit is mounted to one end of the flexible shaft. When torque and thrust are applied to the flexible shaft by a driver, the inner spring expands outwardly and the outer spring contracts inwardly to form a relatively rigid shaft.

11 Claims, 3 Drawing Figures

FLEXIBLE SHAFT AND ROOF DRILLING SYSTEM

BACKGROUND OF THE INVENTION

1. Field of Invention

The present invention relates to drilling systems and shafts therefore and, more particularly, is directed towards a system with a flexible shaft for drilling holes in the roof of a mine.

2. Description of the Prior Art

In the mining industry, falls of mine roofs account for a large percentage of the fatalities that occur in coal mines. Thus, roof control has been a major safety and production consideration. Roof fall fatalities have been greatly reduced in cases where the mine roof is supported with roof bolts that are inserted into holes which are drilled into the mine roof using a drill that is attached to a rigid shaft. As the holes become progressively deeper, the mine worker adds extension sections to the drill shaft. Such an operation requires the worker to be at the head of a roof drilling machine for starting the hole, for adding sections and for inserting the bolts.

U.S. Pat. No. 4,057,115 discloses a flexible shaft for a roof drill with a helically wound inner rod of circular cross section and a helically wound outer band of rectangular cross section. The rod and band are disposed coaxially about an inner sleeve. The round surface of the circular rod provides only line contact, whereby the contact between adjacent turns of the rod is minimal. Minimal contact of adjacent turns of the circular rod tends to permit slippage therebetween and limited strength in axial compression. Due to the foregoing, flat band on circular rod flexible shafts have been met with varying degrees of success.

SUMMARY OF THE INVENTION

It is an object of the present invention to provide a flexible shaft which does not suffer from the heretofore mentioned disadvantages.

Another object of the present invention is to provide a flexible shaft for a roof drilling system.

A further object of the invention is to provide a flexible shaft for drilling holes in the roof of a mine, the holes being of significantly greater length than the height of the mine. The flexible shaft is characterized by a pair of flat bands, each of which is formed into a helical configuration. One of the flat bands defines an outer spring and the other flat band defines an inner spring. The outer flat band is wound left handed into the helical configuration with adjacent convolutions in nesting relationship and the inner flat band is wound right handed into the helical configuration with adjacent convolutions in nesting relationship. The bands are coaxially mounted with the inner surface of the outer band in close proximity with the outer surface of the inner band. One end of the flexible shaft carries a transition member having a socket that is adapted to hold a drill bit. The other end of the flexible shaft is configured to be engaged by a driving mechanism which applies torque and thrust to the shaft during the drilling operation. When torque and thrust are applied to the flexible shaft, the outer spring tends to contract inwardly and the inner spring tends to expand outwardly, the flat surface of the outer spring bears firmly against the flat surface of the inner spring to provide a relatively rigid shaft.

Other objects of the present invention will in part be obvious and will in part appear hereinafter.

The invention accordingly comprises the apparatuses and systems, together with their parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
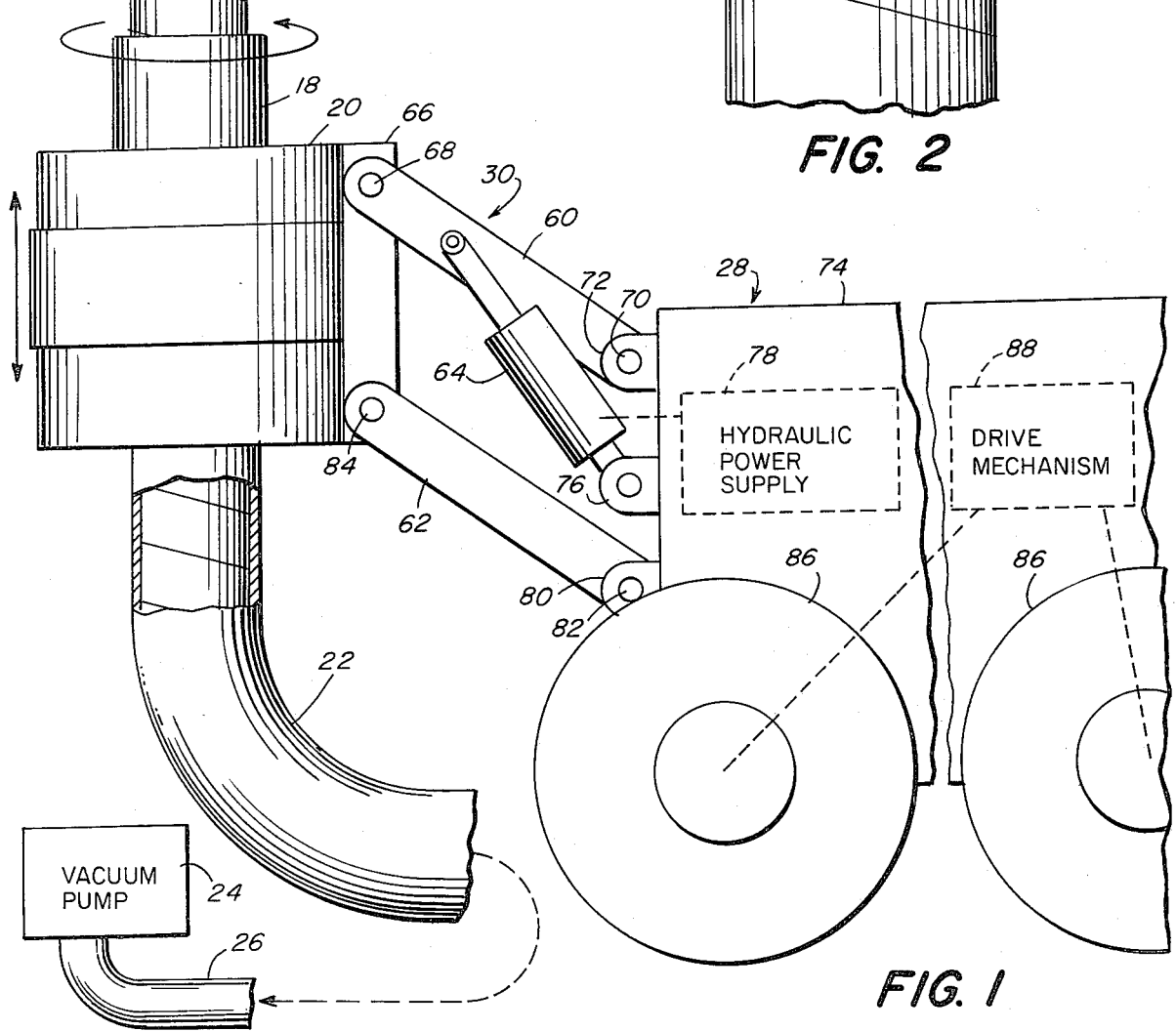
FIG. 1 is a plan view, partly in section, of a drilling system having a flexible shaft embodying the invention.

Referring now to the drawings, particularly FIG. 1, there is shown a system for remote drilling of holes in a mine for roof support, the holes being of significantly greater length than the mine height. The holes are drilled by means of a rock bit 12 that is received in a transition member 14 on one end of a flexible shaft 16 which is significantly longer than the mine height. A chuck 18 of a driver 20 captively holds flexible shaft 16 intermediate its ends. The portion of flexible shaft 16 below driver 20 is slidably and rotatably received within a rigid annular guide 22 that is attached to the lower end of driver 20. The other end of guide 22 is connected to a suction device 24, for example a vacuum pump, via a flexible tube 26 for removal of chips during the drilling operation. Driver 20 is connected to a base 28, for example a wheeled vehicle, by means of a lifting mechanism 30. Driver 20 applies torque and thrust to flexible shaft 16 for advancement of rock bit 12. Lifting mechanism 30 supports driver 20. When driver 20 and lifting mechanism 30 are energized, chuck 18 rotates and cutting edges 32 of rock bit 12 chips away at the formation above the mine roof. The removed chips are sucked into a hollow core 34 of flexible shaft 16 through bores 36 and 38 in rock bit 12 and transition member 14, respectively. As rock bit 12 progresses, lifting mechanism 30 advances the rock bit further into the hole. As hereinafter described, flexible shaft 16 becomes rigid when torque is applied to it.

Figure 3:
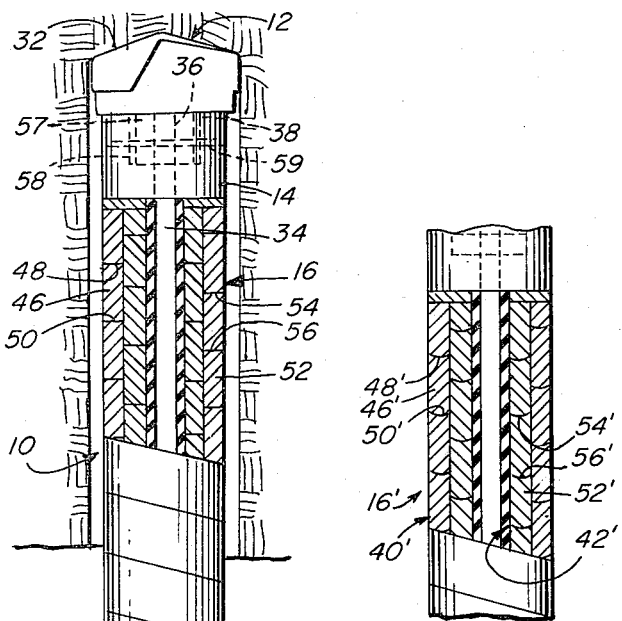
FIG. 3 is a plan view, partly in section, of an alternate embodiment of the flexible shaft of FIG. 1.
Figure 2:
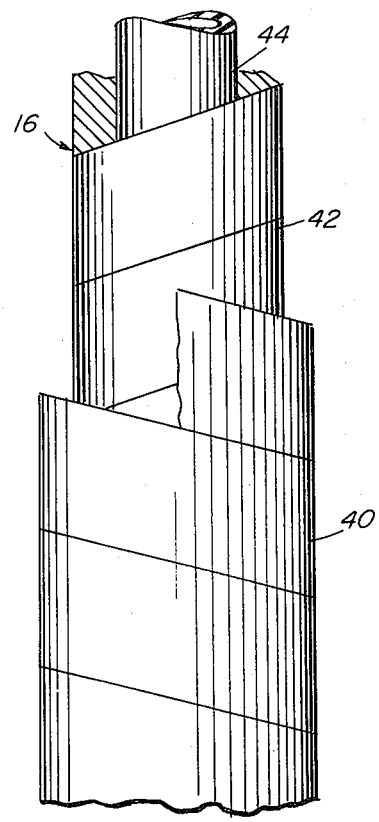
FIG. 2 is a perspective view, partly cutaway, showing the flexible shaft of FIG. 1.

Referring now to FIG. 2, it will be seen that flexible shaft 16 is a cylindrical structure comprised of three concentric members which include an outer spring or casing 40, an intermediate spring or casing 42 and an inner sleeve 44. Outer casing 40, a flat band 46 composed of spring steel and having a substantially rectangular profile in right cross section, is wound into a helical configuration. As best shown in FIG. 1, an upper flat edge 48 of band 46 and a lower flat edge 50 of band 46 are in nesting relationship on adjacent convolutions of band 46. The inner and outer faces of outer casing 40 are flat and in spaced parallel relationship to each other. In the illustrated embodiment, the outside diameter of outer casing is 1.040 inches, the thickness of band 46 is 0.125 inch and the width of band 46 is 0.375 inch. Intermediate casing 42, a flat band 52 composed of spring steel and having a substantially rectangular profile in right cross section, is wound into a helical configuration. As best shown in FIG. 1, a flat upper edge 54 of band 52 and a lower flat edge 56 of band 52 are in nesting on adjacent convolutions of band 52. The inner and outer faces of outer casing 42 are flat and in spaced parallel relationship to each other. In the illustrated embodiment, the thickness of band 52 is 0.125 inch and the width of band 46 is 0.375 inch. Band 46 is wound into its helical configuration in a first direction and band 52 is wound into its helical configuration in a second direction. The first direction being opposite the second direction. In the illustrated embodiment, band 46 is wound left handed and band 52 is wound right handed. The inner surface of outer casing 40 is in contact with the outer surface of intermediate casing 42. Inner sleeve 44 is a tubular member composed of an elastomer, for example rubber. In alternate embodiments, the upper and lower edges of bands 46 and 52 have mating faces that are other than flat. For example, in FIG. 3, there is shown an alternate embodiment of flexible shaft 16 in the form of a flexible shaft 16' having an outer spring 40' and an intermediate spring 42'. Outer spring 42' is a flat band 46' composed of spring steel with an upper concave edge 48' and a lower convex edge 50', edges 48' and 50' being in nesting relationship on adjacent convolutions. Intermediate spring 42' is a flat band 52' composed of spring steel with an upper concave edge 54' and a lower convex edge 56', edges 54' and 56' being in nesting relationship on adjacent convolutions.

The oppositely wound bands 46 and 52 are operative to make flexible shaft 16 relatively rigid when torque and thrust are applied thereto. Outer casing 40 tends to contract inwardly and intermediate casing 42 tends to expand outwardly upon application of torque and thrust to flexible shaft 16, the inner face of band 46 and the outer face of band 52 bearing on each other. Although it is not known with certainty, it is believed that the bulk of the torque transmitted to flexible shaft 16 is carried by outer casing 40 and the bulk of the thrust applied to the flexible shaft is borne by intermediate casing 42. Due to the flat-on-flat configuration of flexible shaft 16, a surface-to-surface contact is established between outer casing 40 and intermediate casing 42. Such surface-to-surface contact provides improved performance of flexible shaft 16 over that provided by the surface-to-line contact of a flat-to-round flexible shaft. Intermediate casing 42 is stronger in axial compression because contact between adjacent turns of band 52 is over a flat area. A circular rod provides line contact between adjacent turns which results in less strength in axial compression. The flat surface-to-surface contact between adjacent turns of band 52 inhibits the tendency for the coils to slip over each other when flexible shaft 16 is in axial compression. The line-to-line contact of adjacent turns of a circular cross-sectional rod enhances slippage of adjacent convolutions over each other. Also, since torsional stiffness of intermediate casing 42 is dependent upon the radius at which the material in band 52 is distributed, a flat cross section tends to provide more material at a larger radius and hence more torsional stiffness than a circular cross section of equal area. Accordingly, the flat cross section of intermediate casing 42 has a larger inner diameter than a casing of circular cross section having equivalent torsional stiffness. The large interior diameter of intermediate casing 42 is desirable to provide area for flushing air and/or chip removal. In certain applications, due to the area contact between adjacent turns of band 52, a tubular channel suitable for carrying flushing air and/or chips at low pressure is formed by the interior surface of band 52 and inner sleeve 44 is not required.

As previously indicated, outer casing 40, intermediate casing 42 and inner casing 44 are disposed coaxially about a longitudinal axis of shaft 16 and extend the length of the shaft. The upper edge of outer casing 40 and the upper edge of intermediate casing 42 are welded to the bottom surface of transition member 14. A shank 57 of rock bit 12 is received in a mating socket 58 of transition member 40, shank 57 being held therein by means of a fastener 59, for example a pin. Bores 36 and 38 extend from the working end of rock bit 12 to the bottom surface of transition member 14 and connect with central core 34 of flexible shaft 16. Central core 34 and bores 36, 38 define a continuous passage that communicates with vacuum pump 24 via flexible tube 26 for removing chips during the drilling operation. When driver 20 is energized during the drilling operation, torque and thrust are applied to shaft 16 which is captively held intermediate its ends in chuck 18 during the drilling operation. Lifting mechanism 30 includes a pair of upper arms 60 and a pair of lower arms 62, and a pair of actuators 64. It is to be noted that only one of each pair of arms and one actuator is shown in the plan view of FIG. 1. One end of upper arm 60 is pivotally mounted to a bracket 66 by means of a pin 68, bracket 66 being mounted to driver 20. The other end of upper arm 60 is pivotally mounted via a pin 70 to a boss 72 that is mounted to a frame 74 of wheeled vehicle 28. Actuator 64, for example a hydraulic actuator, is pivotally mounted to arm 58 and a boss 76 that is attached to frame 74. A hydraulic power supply 78 is provided in wheeled vehicle 28 for hydraulic actuator 64. One end of lower arm 62 is pivotally mounted to a boss 80 on frame 74 by means of a pin 82. The other end of lower arm 62 is pivotally mounted to bracket 66 by means of a pin 84. It is to be understood that the other ones of the pairs of arms 60 and 62 are connected to wheeled vehicle 28 and driver 20 in a similar manner. Also, the other one of the pair of hydraulic actuators 64 is operatively connected to wheeled vehicle 28 and the other one of the pair of arms 60 in the manner previously described. The upper arms, lower arms and hydraulic actuators are interconnected to work in unison. Vehicle 28 is provided with four wheels 86, two of which are shown, that are drivingly connected to a drive mechanism 88 which, preferably, is controlled remotely. Also, in the preferred embodiment, driver 20 is controlled from a remote source.

In operation, wheeled vehicle 28 is positioned in the mine at a location where the roof bolt hole is to be drilled. It is preferred that the height of wheeled vehicle 28 is twenty-six inches or less. When vehicle 28 is in position, driver 20 is actuated and shaft 16 is rotated. As the drilling of the roof bolt hole progresses, driver 20 urges rock bit 12 deeper into the formation being drilled. The direction of rotation of chuck 18 is such that outer casing 40 tends to contract inwardly and intermediate casing 42 tends to expand outwardly for axial stability of shaft 16. That is, chuck rotates in a direction that is opposite to the direction in which band 46 is wound and in the same direction in which band 52 is wound. The free end of shaft 16 is contained within guide 22. The chips of rock formation are drawn from the roof bolt hole by vacuum pump 24. After lifting mechanism 30 reaches its upper limit, shaft 16 is released from chuck 18. It is to be noted that shaft 16 is frictionally held in the roof bolt hole and does not drop downwardly. Next, lifting mechanism 30 is lowered to its lower limit and chuck 18 captively engages a lower section of shaft 16 and so on.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A flexible drill shaft for transmitting torque and thrust, one end of said shaft defining a working end, said shaft comprising:
   (a) a first flat band wound in a helical configuration defining an outer casing, edges of adjacent convolutions of said first flat band in nesting relationship with one another; and
   (b) a second flat band wound in a helical configuration defining an inner casing that is disposed within said outer casing, edges of adjacent convolutions of said second flat band in nesting relationship with one another;
   (c) said outer casing and inner casing coaxially disposed about a longitudinal axis of said shaft and extending the length of said shaft, said outer casing wound in a first direction and said inner casing wound in a second direction, said first direction opposite said second direction, said first band and said second band configured to transform said flexible shaft into a substantially rigid shaft when torque and thrust are applied to said flexible shaft, an inner face of said first flat band and an outer face of said second band bearing against each other in full surface contact when torque and thrust are applied to said flexible shaft, nesting edges of adjacent convolutions of each of said first and second bands having mating profiles for fitted engagement and full surface contact when torque and thrust are applied to said flexible shaft;
   (d) said shaft configured to be engaged intermediate its ends by a torque and thrust applying device, the portion of said shaft between said working end and said engaged section being transformed into a straight rigid shaft when torque and thrust are applied by said device.

2. The flexible shaft as claimed in claim 1 wherein adjacent edges of each of said flat bands in adjacent convolutions have convex and concave mating faces, whereby said adjacent edges of both said flat bands between said engaged section and said working end are in full surface-to-surface contact when torque and thrust are applied by said device intermediate said ends of said flexible shaft.

3. The flexible shaft as claimed in claim 2 wherein said first flat band is wound left handed into said helical configuration and said second band is wound right handed into said helical configuration.

4. The flexible shaft as claimed in claim 3 wherein each of said flat bands is composed of spring steel.

5. The flexible shaft as claimed in claim 2 including a tubular member disposed within said inner casing and defining an inner sleeve.

6. A drilling system comprising:
   (a) drive means having energized and deenergized states;
   (b) a flexible drill shaft with outer casing means and inner casing means, said outer casing means including a flat band that is wound in a first direction into a helical configuration, said inner casing means including a flat band that is wound in a second direction into a helical configuration, said first direction opposite said second direction, abutting edges of each of said bands in adjacent convolutions in nesting relationship, said nesting edges have mating profiles for full surface-to-surface contact of said nesting edges in adjacent convolutions; and
   (c) a transition member mounted to a working end of said shaft, said transition member configured to hold a drill bit;
   (d) said drive means configured to engage said flexible shaft and to apply torque and thrust thereto when in said energized state, said flexible shaft configured to be engaged intermediate its ends by said drive means, an inner face of said outer casing means and an outer face of said inner casing means bearing against each other in full surface contact when torque and thrust are applied to said flexible shaft by said drive means, said oppositely wound helical configurations of said outer casing means and said inner casing means operative to transform said flexible shaft into a relatively straight rigid shaft between said working end and said engaged section when torque and thrust are applied thereto.

7. The drilling system as claimed in claim 6 wherein each said band has a substantially rectangular profile in right cross section.

8. The drilling system as claimed in claim 6 wherein an interior flat face of said band of said outer casing and an exterior flat face of said band of said inner casing are in surface-to-surface contact when torque and thrust are applied to said flexible shaft.

9. The system as claimed in claim 8 wherein said drive means includes chuck means for captively holding said flexible shaft intermediate its ends, said chuck means rotating in said second direction when said drive means is in said energized state.

10. The system as claimed in claim 9 wherein said drive means includes lifting means operatively connected to said chuck means for moving said chuck means in a forward direction for advancing said flexible shaft and in a rearward direction for retracting said flexible shaft.

11. The system as claimed in claim 10 wherein one of said mating profiles is a concave profile and the other of said mating profiles is a convex profile, each of said bands having said concave and convex profiles on opposite edges, the side faces of each of said bands being flat surfaces.

* * * * *